(12) United States Patent
Fröhlich et al.

(10) Patent No.: US 11,114,924 B2
(45) Date of Patent: Sep. 7, 2021

(54) SQUIRREL-CAGE ROTOR FOR AN ASYNCHRONOUS MACHINE

(71) Applicant: CPT Group GmbH, Hannover (DE)

(72) Inventors: Holger Fröhlich, Berlin (DE); Isao Fukumoto, Berlin (DE)

(73) Assignee: VITESCO TECHNOLOGIES GMBH, Hanover (DE)

( * ) Notice: Subject to any disclaimer, the term of this patent is extended or adjusted under 35 U.S.C. 154(b) by 19 days.

(21) Appl. No.: 16/327,479

(22) PCT Filed: Aug. 1, 2017

(86) PCT No.: PCT/EP2017/069396
§ 371 (c)(1),
(2) Date: Feb. 22, 2019

(87) PCT Pub. No.: WO2018/036760
PCT Pub. Date: Mar. 1, 2018

(65) Prior Publication Data
US 2019/0181736 A1    Jun. 13, 2019

(30) Foreign Application Priority Data

Aug. 25, 2016 (DE) ...................... 10 2016 216 027.3

(51) Int. Cl.
*H02K 17/16* (2006.01)
*H02K 9/19* (2006.01)
(Continued)

(52) U.S. Cl.
CPC ............. *H02K 17/165* (2013.01); *H02K 1/16* (2013.01); *H02K 1/26* (2013.01); *H02K 1/30* (2013.01);
(Continued)

(58) Field of Classification Search
CPC .... H02K 17/16; H02K 17/165; H02K 15/028; H02K 1/30; H02K 1/32; H02K 1/16;
(Continued)

(56) References Cited

U.S. PATENT DOCUMENTS

| 4,311,932 A | 1/1982 | Olson | 310/61 |
| 4,600,848 A * | 7/1986 | Sutrina | H02K 9/19 310/211 |

(Continued)

FOREIGN PATENT DOCUMENTS

| CH | 90015 A | 7/1921 | ............... H02K 1/30 |
| DE | 905 044 C | 2/1954 | ............... H02K 1/28 |

(Continued)

OTHER PUBLICATIONS dictionary.com (Year: 2021).*

(Continued)

*Primary Examiner* — Ahmed Elnakib
(74) *Attorney, Agent, or Firm* — Slayden Grubert Beard PLLC

(57) ABSTRACT

Various embodiments include a squirrel-cage rotor for an asynchronous machine comprising: a first shaft journal; a second shaft journal; a laminated rotor core; and a filler body cast onto the laminated rotor core connecting the filler body and the laminated rotor core in a rotationally fixed manner. The filler body is connected to the shaft journals in a rotationally fixed manner and a torque applied to the shaft journals is transmitted to the laminated rotor core.

7 Claims, 6 Drawing Sheets

(51) Int. Cl.
*H02K 15/00* (2006.01)
*H02K 15/02* (2006.01)
*H02K 1/30* (2006.01)
*H02K 1/32* (2006.01)
*H02K 1/16* (2006.01)
*H02K 1/26* (2006.01)
*H02K 3/12* (2006.01)
*H02K 3/48* (2006.01)
*H02K 7/00* (2006.01)

(52) U.S. Cl.
CPC ............... *H02K 1/32* (2013.01); *H02K 3/12* (2013.01); *H02K 3/48* (2013.01); *H02K 7/003* (2013.01); *H02K 9/19* (2013.01); *H02K 15/0012* (2013.01); *H02K 15/028* (2013.01)

(58) Field of Classification Search
CPC .. H02K 1/26; H02K 3/12; H02K 3/48; H02K 7/003; H02K 9/19; H02K 15/0012; H02K 1/185; H02K 2205/09; H02K 5/20
USPC .................................................. 310/54, 211
See application file for complete search history.

(56) References Cited

U.S. PATENT DOCUMENTS

| | | | | |
|---|---|---|---|---|
| 2011/0024073 A1* | 2/2011 | Kamiyama | ............ | H02K 15/03 164/340 |
| 2012/0299404 A1* | 11/2012 | Yamamoto | ............... | H02K 1/32 310/61 |
| 2012/0326555 A1* | 12/2012 | Arimatsu | ................. | H02K 1/30 310/216.121 |
| 2013/0154430 A1* | 6/2013 | Dragon | ................ | H02K 17/165 310/211 |
| 2016/0065035 A1* | 3/2016 | Nakamura | ............... | H02K 3/24 310/59 |
| 2019/0027987 A1* | 1/2019 | Frohlich | .................. | H02K 9/19 |
| 2019/0207449 A1* | 7/2019 | Frohlich | .............. | H02K 17/165 |
| 2019/0356187 A1* | 11/2019 | Frohlich | .................. | H02K 9/06 |
| 2020/0186003 A1* | 6/2020 | Frohlich | ................ | H02K 7/003 |

FOREIGN PATENT DOCUMENTS

| | | | | |
|---|---|---|---|---|
| DE | 964 255 C | | 5/1957 | ............... H02K 1/30 |
| DE | 1122 155 B | | 1/1962 | ............... H02K 1/28 |
| DE | 11 2010 004 773 T5 | | 10/2012 | ............... H02K 1/32 |
| DE | 10 2011 117 517 A1 | | 5/2013 | ............... H02K 1/32 |
| DE | 10 2012 205 757 A1 | | 10/2013 | ............... H02K 1/32 |
| DE | 10 2012 110 157 A1 | | 6/2014 | ............... H02K 1/22 |
| DE | 102012110157 | * | 6/2014 | |
| DE | 10 2013 020 331 A1 | | 7/2014 | ............... H02K 1/32 |
| DE | 10 2015 014 535 A1 | | 7/2016 | ............... H02K 1/28 |
| JP | 57146739 | * | 9/1982 | |
| JP | S57-146739 U | | 9/1982 | ............... H02K 1/30 |
| JP | 2012-210120 A | | 10/2012 | ............... H02K 1/32 |
| JP | 2013-220004 A | | 10/2013 | ............ H02K 17/16 |
| JP | 2013220004 | * | 10/2013 | |
| WO | 2006/064860 A1 | | 6/2006 | ............... H02K 1/28 |
| WO | WO 2006064860 | * | 6/2006 | |
| WO | 2018/036760 A1 | | 3/2018 | ............... H02K 1/30 |

OTHER PUBLICATIONS

German Office Action, Application No. 10 2016 216 027.3, 5 pages, dated Apr. 20, 2017.
International Search Report and Written Opinion, Application No. PCT/EP2017/069396, 23 pages, dated Oct. 25, 2017.

* cited by examiner

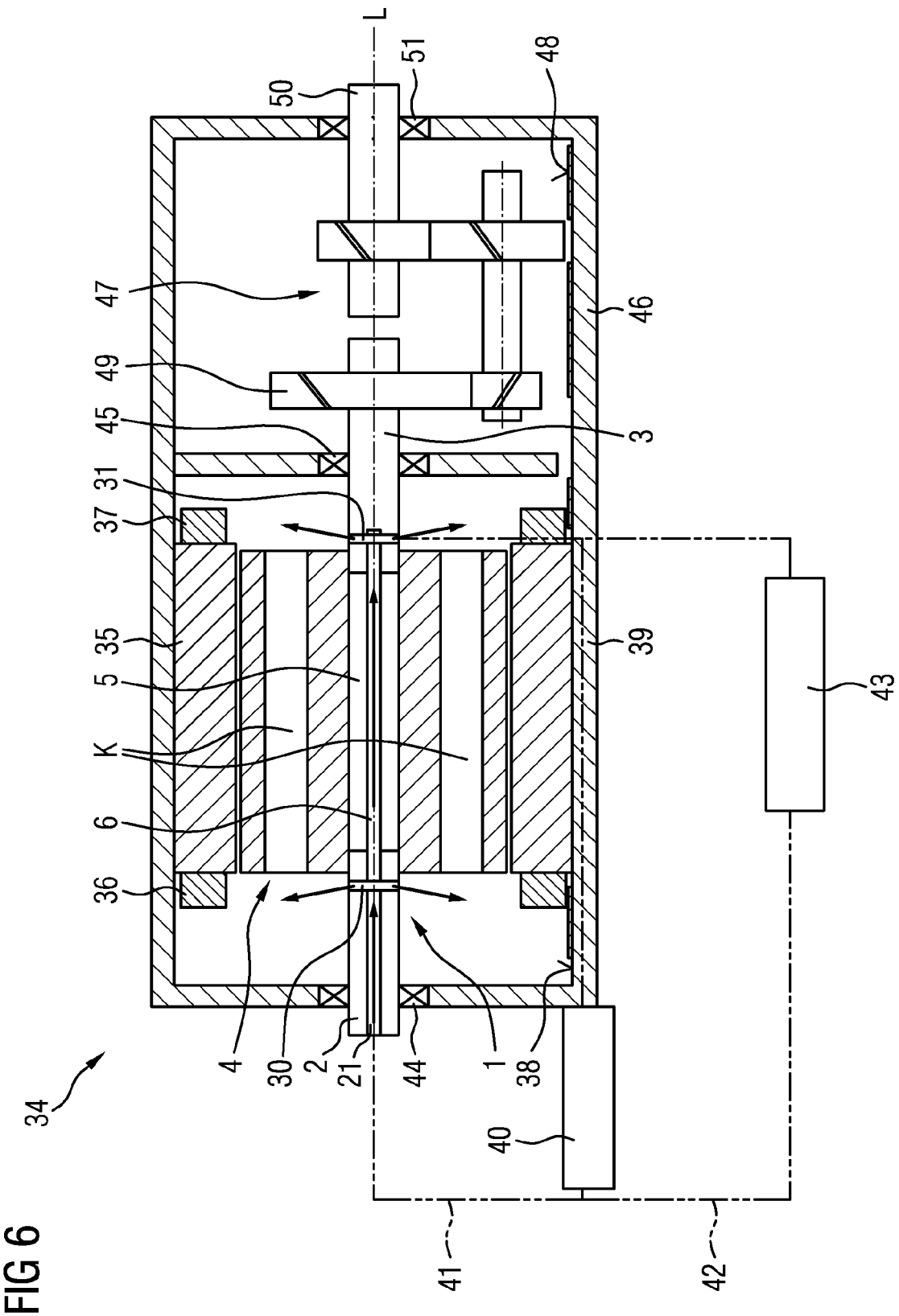

SQUIRREL-CAGE ROTOR FOR AN ASYNCHRONOUS MACHINE

CROSS-REFERENCE TO RELATED APPLICATIONS

This application is a U.S. National Stage Application of International Application No. PCT/EP2017/069396 filed Aug. 1, 2017, which designates the United States of America, and claims priority to DE Application No. 10 2016 216 027.3 filed Aug. 25, 2016, the contents of which are hereby incorporated by reference in their entirety.

TECHNICAL FIELD

The disclosure relates to asynchronous machines. Various embodiments may include a squirrel-cage rotor for an asynchronous machine.

BACKGROUND

Numerous new applications and markets for electromobility pose new challenges in respect of the design of electric drive trains. Previous methods for developing electric drive trains for industry are inadequate for electromobility applications. Essential differences are the type of voltage supply which is generally provided by batteries in traction drives, the limited installation space available, the dynamics or the operating behavior, and also the desire for a weight which is as low as possible for the purpose of saving energy.

In particular, the dynamics, power requirements, operating behaviour, and unit costs are the primary criteria which distinguish a drive train for traction drives from those in industry. The development of an electric drive train for electromobility therefore requires a few additional considerations in comparison to an industrial application. In vehicle drives in which the rotational and translatory masses of the electric motors substantially determine the energy requirement and therefore the battery size, it is necessary to keep the masses as low as possible. That is to say that the rotor of the electrical machine should be equipped with a mass moment of inertia which is as low as possible.

However, known electric drives which are commercially available predominantly have single-piece shafts with a small diameter. The shafts do not have a high weight with this design but, owing to the construction, the entire rotor with the laminated cores fitted does. One known approach or prior art for reducing weight in this context is to punch-out the subregions of the inactive lamination zones.

SUMMARY

The teachings of the present disclosure describe squirrel-cage rotors, asynchronous machines, and methods which allow the weight of the rotor to be reduced. For example, some embodiments include a squirrel-cage rotor (1) for an asynchronous machine (34), the squirrel-cage rotor (1) comprising: a first shaft journal (2), a second shaft journal (3), a laminated rotor core (4), and a filler body (5). The filler body (5) is cast onto the laminated rotor core (4), so that the laminated rotor core (4) is mounted on the filler body (5) in a rotationally fixed manner. The filler body (5) is connected to the shaft journals (2, 3) in a rotationally fixed manner, so that a torque is transmitted from the shaft journals (2, 3) to the laminated rotor core (4).

In some embodiments, the first shaft journal (2) has a first axial bore (21), the second shaft journal (3) has a second axial bore (22), and the filler body (5) has a third axial bore (6). The third axial bore (6) connects the first axial bore (21) to the second axial bore (22), so that the first bore (21), the second bore (22) and the third bore (6) together form a cooling duct (23) which runs through the first shaft journal (2), the filler body (5) and the second shaft journal (3).

In some embodiments, there is a first short-circuiting ring (26) and a second short-circuiting ring (27). The first shaft journal (2) has a first radial bore (30) and the second shaft journal (3) has a second radial bore (31). The first radial bore (30) is connected to the first axial bore (21), the second radial bore (31) is connected to the second axial bore (22), the first short-circuiting ring (26) radially surrounds the first radial bore (30), and the second short-circuiting ring (27) radially surrounds the second radial bore (31), so that, in the event of rotation of the shaft journals (2, 3), a cooling medium can be centrifuged out of the radial bores (30, 31) radially to the outside in the direction of the short-circuiting rings (26, 27) and can cool the short-circuiting rings (26, 27).

In some embodiments, the laminated rotor core (4) is connected to the filler body (5) in an interlocking and force-fitting manner in the axial direction.

In some embodiments, the shaft journals (2, 3) each have an attachment (11, 12), which is arranged on the end side, for centering purposes.

In some embodiments, the shaft journals (2, 3) each have an end plate (19, 20), which is arranged on the end side, for fastening to the filler body (5).

In some embodiments, the filler body (5) forms at least three spokes (24) which extend in the radial direction.

As another example, some embodiments include an asynchronous machine (34) comprising: a squirrel-cage rotor (1) as described above, a stator (35), a first stator end winding (36), and a second stator end winding (37). The first stator end winding (36) surrounds the first short-circuiting ring (26) and the second stator end winding (37) surrounds the second short-circuiting ring (27), so that, in the event of rotation of the shaft journals (2, 3), a cooling medium can be centrifuged out of the radial bores (30, 31) radially to the outside in the direction of the stator end windings (36, 37) and can cool the stator end windings (36, 37).

As another example, some embodiments include a method for producing a squirrel-cage rotor (1) as described above, the squirrel-cage rotor (1) comprising: a first short-circuiting ring (26), a second short-circuiting ring (27), and a plurality of short-circuiting bars (28). The laminated rotor core (4) forms slots for the short-circuiting bars (28) and the short-circuiting bars (28) are each connected to the first short-circuiting ring (26) and to the second short-circuiting ring (27). The method includes: providing the laminated rotor core (4), producing the short-circuiting bars (28) by filling the slots with a melt by means of die-casting, producing the short-circuiting rings (26, 27) by casting a melt onto the laminated rotor core (4) and onto the short-circuiting bars (28), producing the filler body (5) by casting a melt onto the laminated rotor core (4), so that the laminated rotor core (4) is mounted on the filler body (5) in a rotationally fixed manner, and fastening the filler body (5) to the shaft journals (2, 3) using fastening means (29).

BRIEF DESCRIPTION OF THE DRAWINGS

Exemplary embodiments of the teachings herein are explained in more detail below with reference to the schematic drawings, where identical or similar elements are provided with the same reference symbols and in which:

FIG. 6 shows an illustration of a longitudinal section through an exemplary embodiment of an asynchronous machine incorporating teachings of the present disclosure.

DETAILED DESCRIPTION

Figure 1:
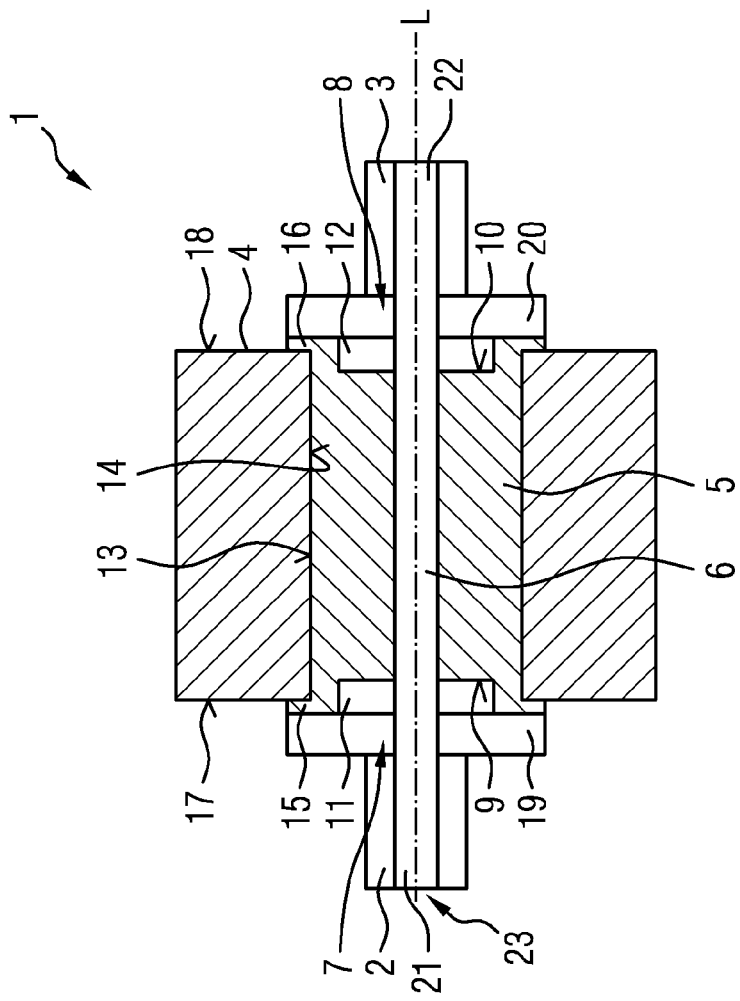
FIG. 1 shows an illustration of a longitudinal section through an exemplary embodiment of a squirrel-cage rotor for an asynchronous machine incorporating teachings of the present disclosure.

In some embodiments, a squirrel-cage rotor for an asynchronous machine comprises a first shaft journal, a second shaft journal, a laminated rotor core, and a filler body, wherein the filler body is cast onto the laminated rotor core, so that the laminated rotor core is mounted on the filler body in a rotationally fixed manner, and the filler body is connected to the shaft journals in a rotationally fixed manner, so that a torque is transmitted from the shaft journals to the laminated rotor core.

In a departure from the prior art, the above-described squirrel-cage rotor has an architecture with which the laminated core cross section can be limited to an actively magnetic flux-directing laminated core cross section, as a result of which a significant reduction in the weight of the squirrel-cage rotor and a reduction in the mass moment of inertia of said squirrel-cage rotor are possible. In this case, a diameter of a central bore within the laminated rotor core can be selected to be particularly large. However, an active filler material of a lamination blank between a rotor shaft and active lamination material of the laminated rotor core can be dispensed with. Instead, when short-circuiting rings and short-circuiting bars are cast onto the laminated rotor core, the region of the formerly inactive lamination zone can also be at least partially filled with a melt, in particular with a light-metal alloy, for example with a die-cast aluminum alloy, as a result of which the filler body is formed.

The filler body fulfills the function, in particular, of transmitting torques between the shaft journals and the laminated rotor core. To this end, the filler body can be cast onto the laminated rotor core in such a way that the filler body is connected to the laminated rotor core in an interlocking manner. Furthermore, the shaft journals can be connected to the filler body in an interlocking and force-fitting manner. In some embodiments, there is no a continuous shaft, and instead a torque which can be transmitted can be ensured by means of the two shaft journals.

In some embodiments, the squirrel-cage rotor is distinguished by a particularly low rotational mass moment of inertia. The particularly low weight of the squirrel-cage rotor may be of particular value for the drive efficiency since the squirrel-cage rotor is a rotating component; this is because the rotational mass moment of inertia of the squirrel-cage rotor can be lowered by at least 10% with this design. This factor may provide important advantages in respect of efficiency for the operating behavior.

In some embodiments, the first shaft journal has a first axial bore, the second shaft journal has a second axial bore, and the filler body has a third axial bore, wherein the third axial bore connects the first axial bore to the second axial bore, so that the first bore, the second bore and the third bore together form a cooling duct which runs through the first shaft journal, the filler body and the second shaft journal. According to this embodiment, a cooling liquid duct is therefore generated by way of the shaft journals being mounted on the filler body. In this case, the shaft journals each have an axial bore which, together with an axial bore of the filler body, form the cooling liquid duct. The cooling liquid duct allows, in particular, direct cooling of the shaft journals and of the filler body.

In some embodiments, the squirrel-cage rotor can further comprise a first short-circuiting ring and a second short-circuiting ring, wherein the first shaft journal has at least one first radial bore, and the second shaft journal has at least one second radial bore. The at least one first radial bore can be connected to the first axial bore, and the at least one second radial bore can be connected to the second axial bore. The first short-circuiting ring can radially surround the at least one first radial bore, and the second short-circuiting ring can radially surround the at least one second radial bore, so that, in the event of rotation of the shaft journals, a cooling medium can be centrifuged out of the radial bores radially to the outside in the direction of the short-circuiting rings and can cool the short-circuiting rings.

In some embodiments, the at least one first radial bore and the at least one second radial bore connect the first/second axial bore of the first/second shaft journal to the outer circumference of the first/second shaft journal. Instead of a single first radial bore and a single second bore, a plurality of first and second radial bores which are distributed, in particular, over the circumference of the shaft journals can also be provided. The features mentioned in the preceding paragraph render possible intensive cooling of the short-circuiting rings, wherein the measures for cooling do not significantly reduce the degree of efficiency of the asynchronous machine and are not achieved at the expense of installation space in the asynchronous machine. The above-described cooling principle is particularly suitable in gearbox-integrated electrical machines (GEM), which provide assistance to an internal combustion engine, and in traction electrical machines (TEM) which can propel a motor vehicle on their own.

An asynchronous machine comprising an above-described cooling system can be realized in an extremely small and compact manner together with maximum continuous power input since the cooling of stator end windings and of the laminated rotor core can be performed by means of a cooling liquid, in particular an electrically insulating cooling liquid, for example an oil or an oil mist. In this case, the radial bores in the shaft journals form nozzles with which the cooling liquid can be distributed by means of a centrifugal force such that the short-circuiting rings of the rotor and the end windings of the stator of the asynchronous machine can be cooled. In this case, the cooling principle includes cooling of rotating and stationary components of the asynchronous machine in a closed housing.

An electrically insulating cooling liquid can accordingly be conducted by means of the shaft journals and the filler body in each case into the regions of the end sides of the rotor where the cooling liquid is centrifuged by centrifugal force to the short-circuiting rings and cools the rotor by means of the "hotspot short-circuiting ring". The short-circuiting ring may be composed of a die-cast aluminum alloy and therefore has a particularly high thermal conductivity.

In some embodiments, the laminated rotor core may be connected to the filler body in an interlocking and force-fitting manner in the axial direction. The filler body can perform a clamp function for the individual laminations of the laminated rotor core. In particular, the filler body can be cast onto the laminated rotor core in such a way that the laminated rotor core is accommodated in a circumferential recess in the filler body, wherein end sections of the filler body which delimit the recess prevent displacement of the laminated rotor core in the axial direction and can hold together/clamp the laminated rotor core in a force-fitting manner in the axial direction.

In some embodiments, the shaft journals can each have an attachment, which is arranged on the end side, for centering purposes. The attachment can be inserted into a corresponding recess within the filler body, as a result of which the respective journal can be oriented in relation to the filler body and can therefore be centered.

In some embodiments, the shaft journals can each have an end plate, which is arranged on the end side, for fastening to the filler body. The end plate serves as a fastening flange and allows particularly resilient and durable connection of the shaft journals to the filler body.

In some embodiments, the filler body may form at least three spokes which extend in the radial direction. The spokes can be configured in such a way that they connect an outer region of the filler body to an inner region of the filler body, wherein the outer region is connected to the laminated rotor core, and wherein the inner region is connected to the first shaft journal and/or to the second shaft journal. The introduction of material between the spokes can be dispensed with, as a result of which the filler body can have a particularly low weight together with a high degree of stability.

Some embodiments may include an asynchronous machine, in particular an asynchronous motor. The asynchronous machine comprises a squirrel-cage rotor according to the first aspect of the invention. Furthermore, the asynchronous machine comprises a stator, a first stator end winding, and a second stator end winding. The first stator end winding surrounds the first short-circuiting ring, and the second stator end winding surrounds the second short-circuiting ring, so that, in the event of rotation of the shaft journals, a cooling medium can be centrifuged out of the radial bores radially to the outside in the direction of the stator end windings and can cool the stator end windings.

The radial bores of the shaft journals therefore make it possible, in the event of rotation of the shaft journals, for preferably electrically insulating cooling liquid which is centrifuged out of the radial bores to be able to be conducted in the direction of and, in some cases, also onto the stator end windings and there be able to cool the stator by means of the "hotspot stator end winding". The stator end winding may comprise a copper winding and therefore has a particularly high thermal conductivity. The asynchronous machine can be cooled, for example, using an oil or an oil mist as coolant, and, in addition to a heat exchanger through which the coolant flows, comprise direct cooling in particular of the shaft journals, the filler body on an inner circumference of the laminated rotor core, the short-circuiting rings of the squirrel-cage rotor and the stator end windings of the stator of the asynchronous machine.

Some embodiments include a method for producing a squirrel-cage rotor, wherein the squirrel-cage rotor comprises, in particular, a first short-circuiting ring, a second short-circuiting ring and a plurality of short-circuiting bars, the laminated rotor core forms slots for the short-circuiting bars, and the short-circuiting bars are each connected to the first short-circuiting ring and to the second short-circuiting ring. The method comprises providing the laminated rotor core, producing the short-circuiting bars by filling the slots with a melt, in particular composed of a light-metal alloy, for example an aluminum alloy, by means of die-casting, producing the short-circuiting rings by casting a melt, in particular composed of a light-metal alloy, for example an aluminum alloy, onto the laminated rotor core and onto the short-circuiting bars, producing the filler body by casting a melt, in particular composed of a light-metal alloy, for example an aluminum alloy, onto the laminated rotor core, so that the laminated rotor core is mounted on the filler body in a rotationally fixed manner, and fastening the filler body to the shaft journals using fastening means.

In some embodiments, a laminated rotor core is therefore stacked, wherein the laminated rotor core is provided with cavities or slots for the short-circuiting bars. The slots in the laminated rotor core form ducts, wherein a die-casting device can be placed at an end of the laminated rotor core and the ducts can be filled with a melt, in particular composed of a light-metal alloy, for example an aluminum die-casting alloy, for example through a passage (in the die-casting device), wherein the ducts which are filled with solidified melt form the short-circuiting bars of the squirrel-cage rotor. In addition, the short-circuiting rings and the filler body are molded or cast onto the laminated rotor core.

In this case, casting-on of the light-metal alloy is performed in such a way that the short-circuiting bars and the short-circuiting rings are not mechanically and electrically connected to the filler body. The light-metal alloy, which is used for producing the short-circuiting bars, may be the same light-metal alloy as is used for producing the first short-circuiting ring and the second short-circuiting ring. The filler body can be cast onto the laminated rotor core and connected to the shaft journals, in particular, in such a way that the shaft journals are connected to the laminated rotor core in an interlocking and force-fitting manner.

In some embodiments, a shaft/hub connection can be established by interlocking connection and force-fitting connection of the shaft journals by means of a cast-on filler body. In addition to the general advantages which accompany methods such as die-casting, a particularly high degree of functional integration is further possible, that is to say establishing an interlocking and force-fitting connection to the shaft journals and also reducing weight and reducing costs when producing the hybrid components of the squirrel-cage rotor. In particular, a reduction in costs is provided owing to the ability to produce the individual elements of the squirrel-cage rotor in segmented design so as to optimize costs. Furthermore, costs can be reduced by the laminated rotor core being constructed in a helical manner. In this context, it is known, for producing annular or helically wound layers of the laminated rotor cores, to bend a straight strip of electrical sheet, which has lateral punched-out portions for forming winding slots, over its entire length in the plane of the strip.

FIG. 1 shows a squirrel-cage rotor 1 for an asynchronous machine, for example an asynchronous machine 34 according to FIG. 6. The squirrel-cage rotor 1 comprises a first shaft journal 2, a second shaft journal 3, a laminated rotor core 4 and a filler body 5. The filler body 5 is cast onto the laminated rotor core 4 and connected to the laminated rotor core 4, for example in an interlocking manner, in such a way that the filler body 5 and the laminated rotor core 4 are connected to one another in a rotationally fixed manner. Therefore, a torque can be transmitted from the filler body 5 to the laminated rotor core 4, and vice versa. In particular, a rotational movement of the filler body 5 about a longitudinal axis L of the squirrel-cage rotor 1 can be transmitted to the laminated rotor core 4, so that the laminated rotor core 4 also rotates about the longitudinal axis L.

The filler body 5 is substantially of cylindrical configuration and has an annular cross section. A central bore 6 passes through the filler body 5 from a first end side 7 of the filler body 5, said first end side being illustrated on the left in FIG. 1, to a second end side 8 of the filler body 5, said second end side being illustrated on the right in FIG. 1. The first end side 7 has a first recess 9, and the second end side 8 has a second recess 10.

The first shaft journal 2 has a first centering ring 11 at its end which is illustrated on the right in FIG. 1 and the second shaft journal 3 has a second centering ring 12 at its end which is illustrated on the left in FIG. 1. The shape of the first centering ring 11 corresponds to the shape of the first recess 9, and the shape of the second centering ring 12 corresponds to the shape of the second recess 10. In the exemplary embodiment shown by FIG. 1, the centering rings 11 and 12 each have an annular and cylindrical cross section with an outside diameter which corresponds to an inside diameter of the plate-like recess 9 and, respectively, 10.

The first centering ring 11 is inserted into the first recess 9, and the second centering ring 12 is inserted into the second recess 10. In this way, the first shaft journal 2 is oriented with respect to the filler body 5 by means of the first recess 9 and the first centering ring 11, wherein a longitudinal axis L of the first shaft journal 2 corresponds to a longitudinal axis L of the filler body 5. The first shaft journal 2 and the filler body 5 are constructed in an axially symmetrical manner in relation to the longitudinal axis L. In a similar way, the second shaft journal 3 is oriented with respect to the filler body 5 by means of the second recess 10 and the second centering ring 12, wherein a longitudinal axis L of the second shaft journal 3 likewise corresponds to the longitudinal axis L of the filler body 5 and the second shaft journal 3 is constructed in an axially symmetrical manner in relation to the longitudinal axis L.

The filler body 5 has, on its outer circumference, a third recess 13 which extends over a large region of the outer circumference. A central bore 14 of the laminated rotor core 4 corresponds to the third recess 13, wherein in particular an inside diameter of the central bore 14 and an outside diameter of the third recess 13 can be matched to one another in such a way that a force-fitting shaft/hub connection is created between the filler body 5 and the laminated rotor core. The third recess 13 is delimited in the longitudinal direction L by two radially running end sections 15 and 16. The laminated rotor core 4 has a first end side 17, which is illustrated on the left in FIG. 1, and a second end side 18, which is illustrated on the right in FIG. 1. The filler body 5, by way of its end sections 15 and 16, is cast onto the end sides 17 and 18 of the laminated rotor core 4 in such a way that the individual laminations of the laminated rotor core 4 are pressed axially against one another by the end sections 15 and 16 (force-fitting connection), but are at least axially held together (interlocking connection). In this way, the end sections 15 and 16 can hold together or clamp the laminated rotor core 4, that is to say they fulfill a kind of "clamp function" for the laminated rotor core 4 which is held together in the longitudinal direction L by the end sections 15 and 16.

The first shaft journal 2 is connected to the filler body 5 in an interlocking and rotationally fixed manner, and the second shaft journal 3 is likewise connected to the filler body 5 in an interlocking and rotationally fixed manner. The connection between the shaft journals 2 and, respectively, 3 and the filler body 5 can be made, for example, by means of a screw connection (cf. FIGS. 3 and 4). According to the embodiment shown by FIG. 1, for this purpose, the first shaft journal 2 has a first screw-on flange or a first fastening ring 19, and the second shaft journal 3 has a second screw-on flange or a second fastening ring 20. The fastening rings 19 and 20 are of cylindrical configuration and have an annular cross section, wherein an outside diameter of the fastening rings 19 and 20 is in each case greater than the outside diameter of the centering rings 11 and 12. The fastening rings 19 and 20 each lie with one of their end sides against one of the end sides 7 or 8 of the filler body 5. The shaft journals 2 and 3 can be, for example, screwed to the filler body 5 in the region of these contact areas.

Torques can be transmitted between the shaft journals 2 and 3 and the filler body 5 owing to the rotationally fixed connection between the filler body 5 and the first shaft journal 2 on the one hand and also the second shaft journal 3 on the other hand. In particular, a rotational movement of the first shaft journal 2 and/or of the second shaft journal 3 can be transmitted to the filler body 5. Rotational movements and torques can also be transmitted from the filler body 5 to the laminated rotor core 4 owing to the rotationally fixed connection between the filler body and the laminated rotor core 4 (see above). Consequently, rotational movements and torques can be transmitted from the first shaft journal 2 and/or the second shaft journal 3 to the laminated rotor core 4 by means of the filler body 5.

The first shaft journal 2 has a central first bore 21, and the second shaft journal 3 has a central second bore 22. The bores 21 and 22 pass through the shaft journals 2 and 3 in the longitudinal direction L in such a way that the bores 21 and 22 connect opposite end sides of the shaft journals 2 and, respectively, 3 to one another. In this case, the bores 21 and 22 of the shaft journals 2 and 3 are in alignment with the central bore 6 ("third bore") of the filler body 5. Therefore, the bores 21 and 22 of the shaft journals 2 and 3 are connected to the central bore 6 of the filler body 5, as a result of which a cooling duct 23 which runs through the entire squirrel-cage rotor 1 in the longitudinal direction L is formed. In particular, a cooling liquid, for example an oil or an oil mist, can be conducted through the cooling duct 23, as a result of which the shaft journals 2 and 3 and the filler body 5 can be cooled from inside.

FIGS. 2 to 5 show how a squirrel-cage rotor 1, for example the squirrel-cage rotor 1 according to FIG. 1, can be specifically fitted out. As is clear from FIG. 2, the filler body 5 does not fill the entire cavity within the central bore 14 of the laminated rotor core 4. The filler body 5 forms three spokes 24 which are each arranged in a manner offset through 120° in relation to one another and which each have, in their radially outer end regions, a threaded bore 25 which serves for respective screw connection to the shaft journal 2 or 3. Owing to the three spokes 24, the filler body 5 has a high degree of stability together with a low weight at the same time.

Figure 2:
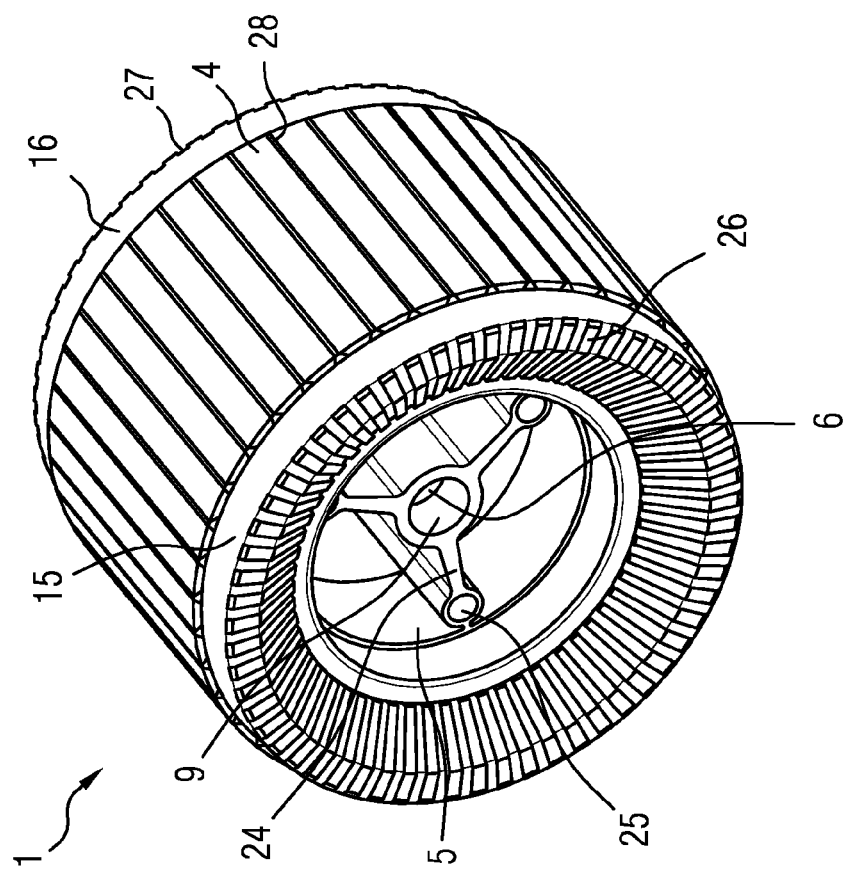
FIG. 2 shows a perspective view of a further exemplary embodiment of a squirrel-cage rotor for an asynchronous machine without shaft journals incorporating teachings of the present disclosure.

The squirrel-cage rotor 1 according to FIG. 2 further comprises a first short-circuiting ring 26 on its front side and a second short-circuiting ring 27 on its rear side, wherein the second short-circuiting ring 27 is of similar design to the first short-circuiting ring 26. The short-circuiting rings 26 and 27 are connected to one another by means of a plurality of short-circuiting bars 28 which are accommodated in slots in the laminated rotor core 4. The slots or the short-circuiting bars 28 run parallel in relation to one another and parallel in relation to the longitudinal axis L. Furthermore, the short-circuiting bars 28 are spaced apart from one another in each case equidistantly in a circumferential direction of the laminated rotor core 4.

The squirrel-cage rotor 1 according to FIG. 2 can be produced, for example, by individual laminations first being punched and stacked in such a way that the laminated rotor core 4 as shown by FIG. 2 is provided. The short-circuiting bars 28 can be produced by a die-casting device (not shown) being placed, for example, in the region of one of the end sides of the laminated rotor core 4 and the slots being filled with a melt through a passage (in the die-casting device), wherein the slots which are filled with solidified melt form the short-circuiting bars 28 of the squirrel-cage rotor 1.

The melt may be, in particular, a molten aluminum-based light-metal alloy. The short-circuiting rings 26 and 27 can be produced by a melt being cast onto the laminated rotor core 4 and onto the short-circuiting bars 28. The melt may be the same melt as is also used for producing the short-circuiting bars 28. The filler body 5 can be produced by a melt being cast onto the laminated rotor core 4, so that the laminated rotor core 4 is mounted on the filler body 5 in a rotationally fixed manner. The melt for producing the filler body 5 may be the same melt as is also used for producing the short-circuiting bars 28 and for producing the short-circuiting rings 26.

Figure 3:
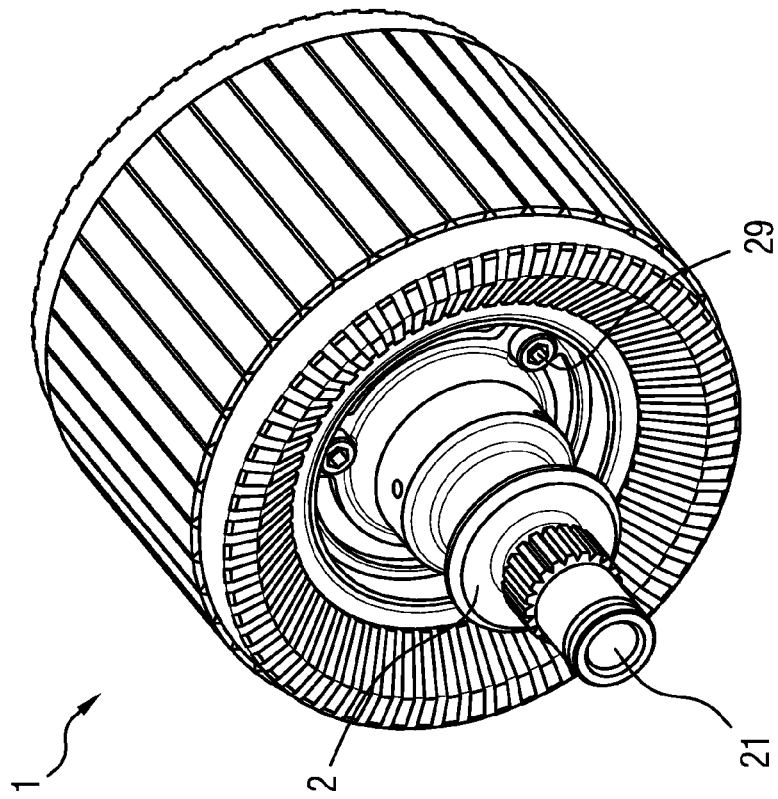
FIG. 3 shows a perspective view of the squirrel-cage rotor according to FIG. 2 with one shaft journal illustrated.
Figure 4:
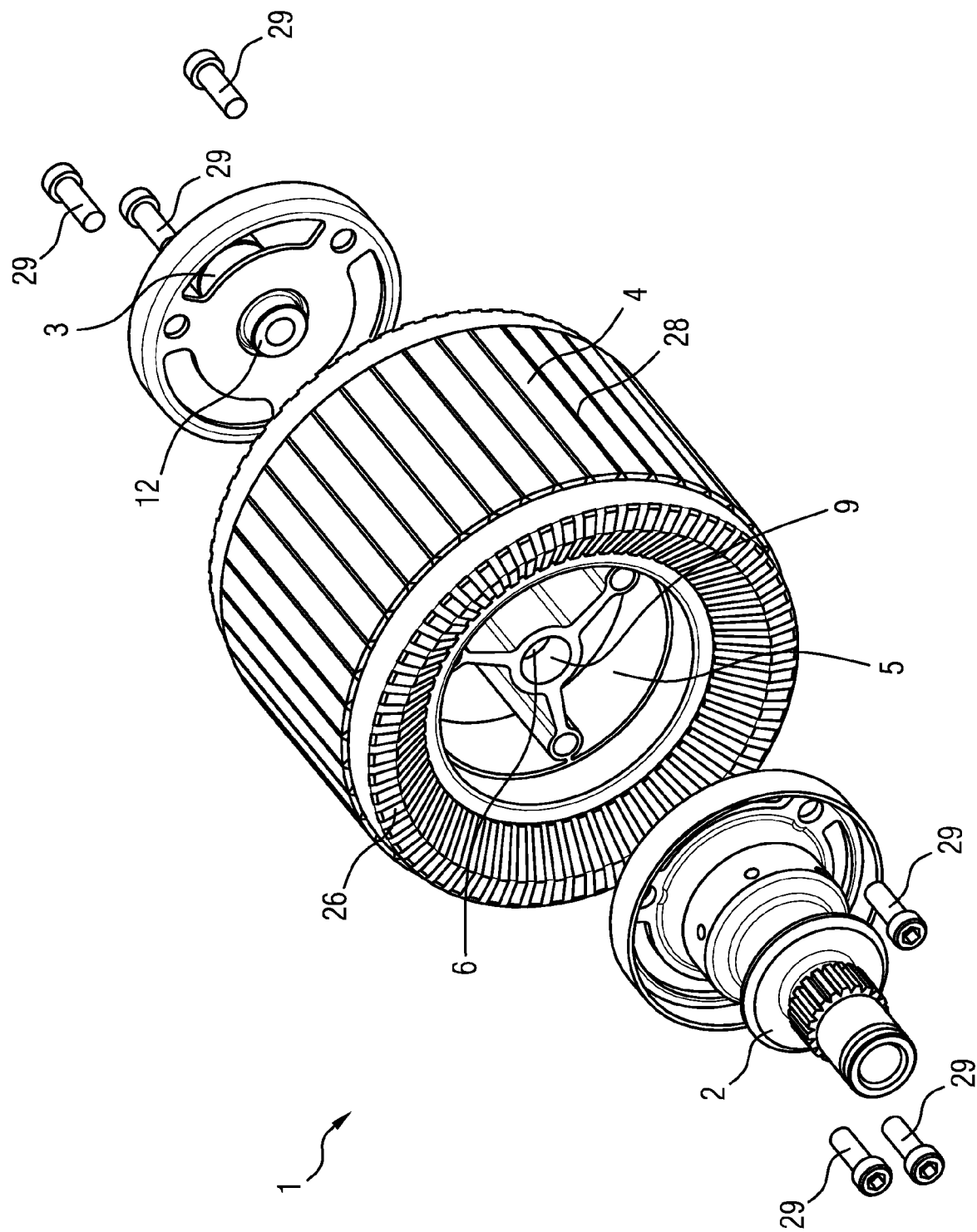
FIG. 4 shows a perspective exploded illustration of the squirrel-cage rotor according to FIG. 2 with 2 shaft journals illustrated.
Figure 5:
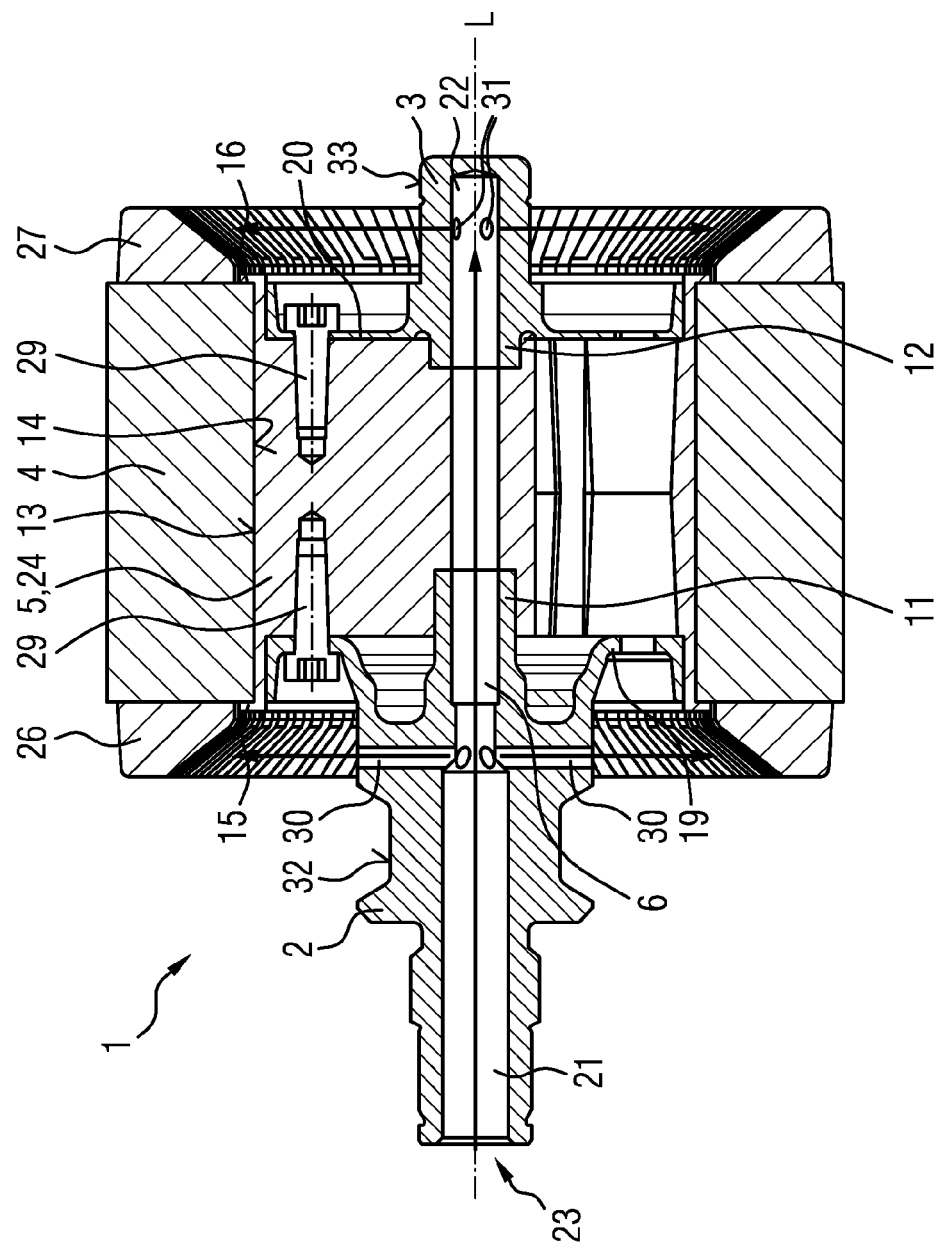
FIG. 5 shows an illustration of a longitudinal section through the squirrel-cage rotor according to FIG. 2 with two shaft journals illustrated.

FIGS. 3 to 5 show the squirrel-cage rotor according to FIG. 2, wherein a first shaft journal 2 is also shown, which is fastened to the front side of the filler body 5 using fastening means 29 in the form of 3 screws, wherein the three screws 29 are screwed into the three threaded bores 25 (FIG. 2). A second shaft journal 3 (FIGS. 4 and 5) is fastened to the rear side of the filler body 5 in a similar way to the first shaft journal.

As is shown in FIG. 5, the first shaft journal 2 may have a plurality of first radial bores 30 which are distributed in the circumferential direction, and the second shaft journal 3 has a plurality of second radial bores 31 which are distributed in the circumferential direction. The radial bores 30 and 31 run perpendicular in relation to the longitudinal axis L of the squirrel-cage rotor 1, wherein the first radial bores 30 connect the first axial bore 21 of the first shaft journal 2 to a first outer circumferential surface 32 of the first shaft journal 2, and the second radial bores 31 connect the second axial bore 22 of the second shaft journal 3 to a second outer circumferential surface 33 of the second shaft journal 3.

A cooling medium, for example an oil or an oil mist, can be conducted through the cooling duct 23. A possible flow direction of the cooling medium within the cooling duct 23 is indicated by arrows in FIG. 5. The cooling medium can be conveyed through the cooling duct 23, for example, by means of a pump, not shown. As an alternative, the laminated rotor core 4 can have helical cooling ducts which, in the event of rotation of the laminated rotor core, allow a suction action by means of which the cooling medium is drawn into the cooling duct 23, conducted through it and conveyed out of it without the need for a pump.

In the event of rotation of the first shaft journal 2 and of the second shaft journal 3, the cooling medium which is located within the cooling duct 23 is conveyed through the radial bores 30 and 31 by centrifugal forces which act on the cooling medium within the radial bores 30 and 31, and centrifuged out of said radial bores in the radial direction. As is clear from FIG. 5 in particular, the first radial bore 30 of the first shaft journal 2 is surrounded in the radial direction by the first short-circuiting ring 26, and the second radial bore 31 of the second shaft journal 3 is surrounded in the radial direction by the second short-circuiting ring 27. As it continues to move, the cooling medium which is centrifuged out of the radial bores 30 and 31 meets the first short-circuiting ring 26 and, respectively, the second short-circuiting ring 27 and cools them.

FIG. 6 shows an asynchronous machine 34 comprising a squirrel-cage rotor 1 which can be of similar construction to the squirrel-cage rotor according to FIGS. 1 to 5. The squirrel-cage rotor 1 is surrounded in the radial direction by a stator 35 having a first stator end winding 36, which is illustrated on the left in FIG. 6, and having a second stator end winding 37, which is illustrated on the right in FIG. 6. The stator end windings 36 and 37 each surround a short-circuiting ring, not shown by FIG. 6, of the squirrel-cage rotor 1 (cf., for example, FIGS. 2 to 5 in this respect). The laminated rotor core 4 of the squirrel-cage rotor 1 further comprises punched-in cooling ducts K.

A first shaft journal 2 of the squirrel-cage rotor 1 has—similarly to the manner shown by FIGS. 2 to 5—a plurality of radial first bores 30 which are distributed in the circumferential direction. A second shaft journal 3 of the squirrel-cage rotor 1 likewise has—similarly to the manner shown by FIGS. 2 to 5—a plurality of second radial bores 31 which are distributed in the circumferential direction. The first stator end winding 36 surrounds the radial first bores 30 in the radial direction, and the second stator end winding 37 surrounds the radial second bores 31. In the event of rotation of the first shaft journal 2, the filler body 5 and also the second shaft journal 3, cooling medium, which is located within a cooling duct 23 of the squirrel-cage rotor 1, is—as described in connection with FIG. 5—conveyed through the cooling duct 23 and centrifuged out of the radial bores 30 and 31 in the direction of the stator end windings 36 and 37. As it continues to move, the cooling medium which is centrifuged out of the radial bores 30 and 31 meets, in particular, the stator end windings 36 and 37 and cools them. Subsequently, the cooling medium drips into a sump 38 of a first housing section 39 of the asynchronous machine 34.

The cooling medium, which is conducted through the cooling duct 23 and after cooling, in particular, of the stator end windings 36 and 37 drips into the sump 38, can be conducted through a heat exchanger 40 in order to be re-cooled there. Conveying the cooling medium out of the sump 38 through the heat exchanger 40 and through the cooling duct 23 can be performed by means of a pump, not shown, or by helical cooling ducts within the laminated rotor core 4, as has been described in connection with FIG. 5. In this way, a recirculation cooling circuit 41 is formed, the possible course of said recirculation cooling circuit being indicated using a dash-and-dot line in FIG. 6. In order to re-cool the cooling medium within the heat exchanger 40, cooling water, which is circulated in a main cooling circuit 42 within which a main water cooler 43 for re-cooling the cooling water is located, flows through said heat exchanger. The cooling water can circulate within the main cooling circuit 42 by means of a pump, not shown.

FIG. 6 further shows that the first shaft journal 2 is rotatably mounted in a first bearing 44 which is fastened within the first housing section 39, and that the second shaft journal 3 is rotatably mounted in a second bearing 45 which is likewise fastened within the first housing section 39. A transmission 47 with a further sump 48 is located in a second housing section 46. The transmission 47 is connected to the second shaft journal 3 by means of a first gear 49, wherein an output shaft 50 of the transmission 47 is rotatably mounted in a third bearing 51 and protrudes out of the second housing section, wherein the third bearing 51 is fastened within the second housing section 46.

What is claimed is:

1. A squirrel-cage rotor for an asynchronous machine, the squirrel-cage rotor comprising:
    a first shaft journal comprising a first shaft journal bearing surface;
    a second shaft journal comprising a second shaft journal bearing surface;
    a laminated rotor core; and
    a filler body cast onto the laminated rotor core connecting the filler body and the laminated rotor core in a rotationally fixed manner;
    wherein the filler body is connected to the shaft journal bearing surfaces in a rotationally fixed manner and a torque applied to the shaft journals is transmitted to the laminated rotor core;
    wherein the filler body comprises three spokes extending in a radial direction;
    each of the three spokes includes two respective threaded bores at opposing ends; and
    the first shaft journal bearing surface is attached to the laminated rotor core by three screws fastened into the threaded bores of the three spokes at a first end of the laminated rotor core and the second shaft journal bearing surface is attached to the laminated rotor core by three screws fastened into the threaded bores of the three spokes at a second end of the laminated rotor core.

2. The squirrel-cage rotor as claimed in claim 1, wherein:
    the first shaft journal bearing surface includes a first axial bore;
    the second shaft journal bearing surface includes a second axial bore;
    the filler body includes a third axial bore;
    the third axial bore connects the first axial bore to the second axial bore; and
    the first bore, the second bore, and the third bore form a cooling duct running through the first shaft journal, the filler body, and the second shaft journal.

3. The squirrel-cage rotor as claimed in claim 2, further comprising:
    a first short-circuiting ring; and
    a second short-circuiting ring;
    wherein the first shaft journal includes a first radial bore; and
    the second shaft journal includes a second radial bore;
    the first radial bore is connected to the first axial bore;
    the second radial bore is connected to the second axial bore;
    the first short-circuiting ring radially surrounds the first radial bore;
    the second short-circuiting ring radially surrounds the second radial bore; and
    rotation of the shaft journals drive a cooling medium out of the radial bores radially to the outside in the direction of the short-circuiting rings and can cool the short-circuiting rings.

4. The squirrel-cage rotor as claimed in claim 1, wherein the laminated rotor core is connected to the filler body in an interlocking and force-fitting manner in the axial direction.

5. The squirrel-cage rotor as claimed in claim 1, wherein the shaft journal bearing surfaces each includes an attachment arranged on the end side for centering purposes.

6. The squirrel-cage rotor as claimed in claim 1, wherein the shaft journal bearing surfaces each include an end plate including three through holes for fastening the screws to the filler body.

7. An asynchronous machine comprising:
    a stator;
    a first stator end winding;
    a second stator end winding; and
    a squirrel-cage rotor comprising:
        a first shaft journal comprising a first shaft journal bearing surface;
        a second shaft journal comprising a second shaft journal bearing surface;
        a laminated rotor core; and
        a filler body cast onto the laminated rotor core connecting the filler body and the laminated rotor core in a rotationally fixed manner;
    wherein the filler body is connected to the shaft journals in a rotationally fixed manner and a torque applied to the shaft journals is transmitted to the laminated rotor core;
    wherein the first stator end winding surrounds a first short-circuiting ring; and
    the second stator end winding surrounds a second short-circuiting ring; and
    rotation of the shaft journals drive a cooling medium out of radial bores radially to the outside in the direction of the stator end windings and can cool the stator end windings;
    wherein the filler body comprises three spokes extending in a radial direction;
    each of the three spokes includes two respective threaded bores at opposing ends; and
    the first shaft journal bearing surface is attached to the laminated rotor core by three screws fastened into the threaded bores of the three spokes at a first end of the laminated rotor core and the second shaft journal bearing surface is attached to the laminated rotor core by three screws fastened into the threaded bores of the three spokes at a second end of the laminated rotor core.

\* \* \* \* \*